United States Patent
Pant et al.

(10) Patent No.: US 11,169,819 B2
(45) Date of Patent: Nov. 9, 2021

(54) INFORMATION HANDLING SYSTEM (IHS) AND METHOD TO PROACTIVELY RESTORE FIRMWARE COMPONENTS TO A COMPUTER READABLE STORAGE DEVICE OF AN IHS

(71) Applicant: DELL PRODUCTS L.P., Round Rock, TX (US)

(72) Inventors: Alok Pant, Austin, TX (US); Ibrahim Sayyed, Georgetown, TX (US); Venkata Atta, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 174 days.

(21) Appl. No.: 16/400,679

(22) Filed: May 1, 2019

(65) Prior Publication Data

US 2020/0348946 A1 Nov. 5, 2020

(51) Int. Cl.
*G06F 9/4401* (2018.01)
*G06F 8/61* (2018.01)
(Continued)

(52) U.S. Cl.
CPC .............. *G06F 9/4411* (2013.01); *G06F 8/61* (2013.01); *G06F 9/4416* (2013.01);
(Continued)

(58) Field of Classification Search
CPC .. G06F 9/4411; G06F 9/4416; G06F 9/44505; G06F 9/542; G06F 8/61; G06F 11/1417; G06F 11/22
See application file for complete search history.

(56) References Cited

U.S. PATENT DOCUMENTS 6,757,838 B1 6/2004 Chaiken et al.
7,069,431 B2 6/2006 Dayan et al.
(Continued)

OTHER PUBLICATIONS

Chaiken et al., "Systems and Methods for Detecting Errors and/or Restoring Non-Volatile Random Access Memory Using Error Correction Code", U.S. Appl. No. 15/962,665, filed Apr. 25, 2018, 32 pgs.

(Continued)

*Primary Examiner* — Glenn A. Auve
(74) *Attorney, Agent, or Firm* — Egan, Enders & Huston LLP

(57) ABSTRACT

Embodiments of information handling systems (IHS) and computer implemented methods are disclosed herein to proactively restore missing firmware components to a computer readable storage device of an IHS. In one embodiment, a method may execute a first set of program instructions, before an operating system (OS) is loaded into a system memory of the IHS, to determine if one or more firmware components previously stored within the computer readable storage device is/are missing. If the first set of program instructions determines at least one firmware component is missing, the method may execute additional program instructions to retrieve a copy of the missing firmware component(s) from a remotely located system, and store the retrieved copy of the missing firmware component(s) within the computer readable storage device. The additional program instructions can be executed before the OS is loaded in some embodiments, and after the OS is loaded in other embodiments.

19 Claims, 4 Drawing Sheets

(51) Int. Cl.
G06F 9/54 (2006.01)
G06F 9/445 (2018.01)
G06F 11/14 (2006.01)

(52) U.S. Cl.
CPC .......... G06F 9/44505 (2013.01); G06F 9/542 (2013.01); G06F 11/1417 (2013.01)

(56) References Cited

U.S. PATENT DOCUMENTS

| | | | |
|---|---|---|---|
| 9,417,967 B2 | 8/2016 | Huang et al. | |
| 9,846,616 B2 | 12/2017 | Grobelny | |
| 9,846,617 B2 | 12/2017 | Rahardjo et al. | |
| 10,481,893 B1* | 11/2019 | Righi | G06F 8/65 |
| 2004/0076043 A1* | 4/2004 | Boals | G06F 11/1417 365/200 |
| 2004/0230788 A1* | 11/2004 | Zimmer | G06F 11/1441 713/2 |
| 2009/0249120 A1* | 10/2009 | Yao | G06F 11/1417 714/15 |
| 2012/0124567 A1* | 5/2012 | Landry | G06F 8/654 717/168 |
| 2014/0325203 A1* | 10/2014 | Roche | G06F 3/065 713/2 |
| 2015/0277930 A1* | 10/2015 | Sarangdhar | G06F 11/1417 713/2 |
| 2016/0019116 A1 | 1/2016 | Gopal et al. | |
| 2016/0085667 A1 | 3/2016 | Huang | |
| 2016/0378696 A1* | 12/2016 | Warkentin | G06F 13/4282 710/104 |
| 2017/0337064 A1* | 11/2017 | Vidyadhara | G06F 9/4401 |
| 2018/0060077 A1* | 3/2018 | Abdulhamid | G06F 21/57 |
| 2018/0322012 A1* | 11/2018 | Sharma | G06F 11/1451 |
| 2019/0251264 A1* | 8/2019 | Jayakumar | G06F 9/455 |
| 2020/0012501 A1* | 1/2020 | Suryanarayana | G06F 21/52 |

OTHER PUBLICATIONS

Montero et al., "Information Handling Systems and Method for Restoring Firmware in One or More Regions of a Flash Memory Device", U.S. Appl. No. 16/229,264, filed Dec. 21, 2018, 35 pgs.

Chaiken et al., "Information Handling System Firmware Bit Error Detection and Correction", U.S. Appl. No. 16/145,401, filed Sep. 28, 2018, 21 pgs.

Montero et al., "Securely Sharing a Memory Between an Embedded Controller (EC) and a Platform Controller Hub (PCH)", U.S. Appl. No. 15/922,694, filed Mar. 15, 2018, 17 pgs.

Chaiken, "Verifying Basic Input/Output System (BIOS) Boot Block Code", U.S. Appl. No. 15/902,250, filed Feb. 22, 2018 17 pgs.

* cited by examiner

INFORMATION HANDLING SYSTEM (IHS) AND METHOD TO PROACTIVELY RESTORE FIRMWARE COMPONENTS TO A COMPUTER READABLE STORAGE DEVICE OF AN IHS

FIELD

This invention relates generally to information handling systems (IHSs), and more particularly, to hardware, software and/or firmware components of an IHS and related methods for restoring firmware components.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems (IHSs) typically include a boot system such as, for example, a Basic Input/Output System (BIOS) or Unified Extensible Firmware Interface (UEFI) that operates to initialize hardware components during the boot process and to provide runtime services for operating systems and programs. The boot system code is generally implemented as boot firmware, which is typically stored in non-volatile memory, such as read only memory (ROM) or a Flash memory device.

In some information handling systems, a small amount (e.g., up to about 1 MB) of boot code (e.g., a "boot block") may be stored in ROM, while the majority of the boot code (e.g., a "main BIOS image") is stored in a Flash memory device. Upon system start-up or reboot, a processing device (such as a central processing device, CPU, or an embedded controller, EC) may execute the boot block stored in ROM to initiate the boot process and retrieve the main BIOS image from the Flash memory device. The processing device may then execute boot code within the main BIOS image to test and initialize the IHS hardware components, perform a Power-On Self-Test (POST) to ensure the hardware configuration is valid and working properly, load an operating system (OS) from a computer readable storage device, and/or perform a variety of other actions known in the art.

If the boot system fails, the operating system does not load and the information handling system may be rendered unusable. A boot failure may occur when the main BIOS image stored in Flash memory is missing, misconfigured or corrupt. For example, the main BIOS image stored in Flash memory may be damaged or corrupt when updates or changes are made to the main BIOS image. If the main BIOS image is damaged or corrupt, the processing device may fail to boot the information handling system and the system may be left in a hung state.

Some information handling systems utilize a boot recovery system or method to replace a damaged boot block/main BIOS image with an undamaged boot block/main BIOS image. In some conventional boot recovery systems, a BIOS recovery image may be stored within an internal storage device (e.g., a hard disk drive, HDD, solid state drive, SDD, or controller) contained within the IHS, or within an external storage device (e.g., a USB storage device) removably coupled to the IHS. The BIOS recovery image may be substantially identical to the main BIOS image initially stored in Flash memory, and in some cases, may include the entire BIOS region. If the boot block is undamaged, the processing device may execute the boot block to replace a damaged main BIOS image with an undamaged BIOS recovery image obtained from an internal or external storage device, thereby restoring the main BIOS image in Flash memory. When the IHS is rebooted, the restored BIOS image may be executed by the processing device to successfully complete the boot process.

The conventional boot recovery system discussed above suffers from several disadvantages. For example, recovering the BIOS image from an external storage device (such as a USB storage device) is inconvenient, as it requires a user to copy the main BIOS image to the external storage device when the system is first configured, and then locate and manually insert the storage device to restore the system. On the other hand, recovering the BIOS image from an internal storage device (such as a HDD, SDD or controller) may not always be possible. There are many scenarios that may cause the BIOS recovery image to be missing or deleted from the hard drive, such as for example, when a user replaces the hard drive or reformats the hard drive to install a new OS image.

In another conventional boot recovery system, a backup boot block may be stored in ROM, along with the primary boot block, to provide a means for restoring the boot system when the primary boot block is damaged. In such boot recovery systems, a user of the information handling system may use a Hot key or jumper to trigger a "top swap" action (e.g., by setting a top swap register in the chipset to 1) if the primary boot block is damaged. The top swap action redirects the processing device from the first boot entry pointer (i.e., memory location of the primary boot block, 0xFFFFFFF0) to the top swap address (i.e., memory location of the backup boot block, 4G). The processing device may then execute the backup boot block to recover the BIOS image from an external storage device (such as a USB storage device) or an internal storage device (such as a HDD, SDD or controller). After restoring the BIOS image in Flash memory, the top swap register may be set to 0, and the system may be rebooted using the restored BIOS image to successfully complete the boot process.

In the aforementioned boot recovery system, the top swap action is used to redirect the processing device to a backup boot block stored in ROM when the primary boot block is damaged or corrupt. While the top swap boot recovery method provides a means to restore the boot system when the primary boot block is damaged, the method is chipset dependent (supported only by Intel) and is an optional feature that carries an additional licensing cost. To implement the Intel top swap boot recovery method, the primary boot block and the backup boot block are each limited to a maximum size of 1 MB. If the optional top swap feature is supported by the chipset, the boot system must re-layout the boot system map, which requires changes to be made to the BIOS code. Finally, the top swap boot recovery method still uses an internal or external storage device to recover the BIOS image, and thus, suffers from inconvenience and/or does not take into account that the BIOS recovery image may be missing from the storage device, as discussed above.

One other problem is that BIOS feature sets are becoming richer, and thus, more difficult to fit within the size constraints (e.g., 32 MB) of the Flash memory device. For this reason, some IHSs may overcome Flash memory space constraints by storing additional boot firmware components that provide extended or optional boot features on the hard drive. In one example, additional boot firmware components may be stored in an EFI system partition (ESP) of the hard drive with the expectation that these components will be present in the hard drive when needed. As noted above, however, these components may not be available if the user subsequently replaces or reformats the hard drive.

A solution is, therefore, needed to ensure that boot firmware components (such as, e.g., a BIOS recovery image and/or additional boot firmware components) are proactively restored to the hard drive before there is a need to use these components.

SUMMARY OF THE INVENTION

The following description of various embodiments of information handling systems and related methods is not to be construed in any way as limiting the subject matter of the appended claims.

According to various embodiments of the present disclosure, information handling systems and methods are provided herein for proactively restoring firmware component(s) to a computer readable storage device of an information handling system (IHS) before such component(s) are needed. In one or more of the embodiments disclosed herein, a computer readable storage device (e.g., a HDD or SDD) may be configured to store backup boot firmware (e.g., a "BIOS recovery image") and/or additional boot firmware components that provide extended or optional boot features. As described in more detail below, hardware and firmware components are provided within the information handling system for locating the boot firmware components stored on the computer readable storage device, and restoring any boot firmware components determined to be missing. In some embodiments, a processing device (such as, e.g., a host processor) of the IHS may be configured to proactively restore the missing boot firmware component(s) by retrieving a copy of the missing boot firmware component(s) from a remotely located system, and storing the retrieved copy within the computer readable storage device of the IHS.

Unlike conventional boot recovery systems and methods, the systems and methods disclosed herein may be used to restore damaged, corrupt or missing boot firmware components before such component(s) are actually needed. In addition, the disclosed systems and methods are chipset independent and do not require any boot firmware changes, additional hardware or user intervention. Furthermore, the disclosed systems and methods ensure that extended/optional boot firmware components are always available on the computer readable storage device if/when needed.

According to one embodiment, an information handling system provided herein may generally include a computer readable non-volatile memory configured to store boot firmware and Advanced Configuration and Power Interface (ACPI) firmware, a computer readable storage device configured to store one or more boot firmware components and an operating system (OS), and a processing device configured to execute the boot firmware when the IHS is powered on or rebooted. Before the OS is loaded into a system memory of the IHS, the processing device may execute program instructions contained within a boot service of the boot firmware to locate the one or more boot firmware components stored within the computer readable storage device.

If the boot service determines at least one of the boot firmware components is missing from the computer readable storage device, the processing device may be configured to execute additional program instructions to retrieve a copy of the at least one boot firmware component from a remotely located system, and store the retrieved copy of the at least one boot firmware component within the computer readable storage device. In some embodiments, the additional program instructions may be contained within an additional boot service of the boot firmware and executed by the processing device before the OS is loaded into the system memory. In other embodiments, the additional program instructions may be contained within a runtime service of the ACPI firmware and executed by the processing device after the OS is loaded into the system memory and executed by the processing device.

In some embodiments, the processing device may be configured to execute further program instructions prior to retrieving the copy of the at least one boot firmware component from a remotely located system. For example, the processing device may execute further program instructions to display a warning message informing a user of the IHS that the at least one boot firmware component is missing and requesting user consent to retrieve the copy of the at least one boot firmware component from the remotely located system. In some embodiments, the copy of the at least one boot firmware component may be retrieved from the remotely located system only if user consent is received.

In some embodiments, the computer readable non-volatile memory may be further configured to store a recovery table comprising a path and a link for each boot firmware component stored within the computer readable storage device. The path may specify a file location of a boot firmware component stored within the computer readable storage device. The link may be a Universal Resource Locator (URL) link to download a copy of the boot firmware component from the remotely located system.

In some embodiments, the processing device may execute the boot service to check the path(s) stored within the recovery table to locate the one or more boot firmware components stored within the computer readable storage device. If the boot service determines at least one boot firmware component is missing from the computer readable storage device, the URL link stored within the recovery table may be used to download a copy of the at least one boot firmware component from the remotely located system.

In some embodiments, an additional boot service of the boot firmware may use the URL link stored within the recovery table to retrieve a copy of the at least one boot firmware component from the remotely located system and store the received copy of the at least one boot firmware component within the computer readable storage device before the OS is loaded into the system memory.

In other embodiments, a runtime service of the ACPI firmware may use the URL link stored within the recovery table to retrieve a copy of the at least one boot firmware component from the remotely located system and store the received copy of the at least one boot firmware component within the computer readable storage device after the OS is loaded into the system memory.

According to another embodiment, a method is provided herein to proactively restore missing firmware components to a computer readable storage device of an information handling system (IHS). The disclosed method may generally be performed by a processing device of an IHS, and thus, is a computer implemented method performed by hardware, software and/or firmware components of an IHS. In some embodiments, the computer implemented method may be used proactively restore missing boot firmware components (such as, e.g., backup boot firmware and/or additional boot firmware components that provide extended or optional boot features), which were previously stored within the computer readable storage device. It is noted, however, that the computer implemented method disclosed herein is not strictly limited to restoring boot firmware components, and may be alternatively configured to restore other software/firmware modules previously stored within the computer readable storage device.

In general, the computer implemented method may execute a first set of program instructions, before an operating system (OS) is loaded into a system memory of the IHS, to locate one or more firmware components previously stored within the computer readable storage device. If the first set of program instructions locates the one or more firmware components within the computer readable storage device, the method may load the OS into the system memory to boot the OS. However, if the first set of program instructions determines that at least one of the one or more firmware components is missing from the computer readable storage device, the method may execute a second set of program instructions to retrieve a copy of the at least one firmware component from a remotely located system, and a third set of program instructions to store the retrieved copy of the at least one firmware component within the computer readable storage device.

In some embodiments, the second set of program instructions and the third set of program instructions may be executed before the OS is loaded into the system memory, if the first set of program instructions determines that the at least one firmware component is missing from the computer readable storage device. For example, the second set of program instructions and the third set of program instructions may be included within an additional boot service of the boot firmware, as discussed above.

In other embodiments, the second set of program instructions and the third set of program instructions may be executed after the OS is loaded into the system memory, if the first set of program instructions determines that the at least one firmware component is missing from the computer readable storage device. For example, the second set of program instructions and the third set of program instructions may be included within a runtime service of the ACPI firmware, as discussed above.

In some embodiments, if the first set of program instructions determines that the at least one firmware component is missing from the computer readable storage device, the method may execute a fourth set of program instructions to display a warning message to the user. For example, the warning message may inform a user of the IHS that the at least one firmware component is missing and request user consent to retrieve the copy of the at least one firmware component from the remotely located system. In such embodiments, the method may execute the second set of program instructions to retrieve the copy of the at least one firmware component from the remotely located system only if user consent is received.

As noted above, a recovery table may be stored within a computer readable non-volatile memory of the IHS. If included, the recovery table may store a path specifying a file location of each firmware component stored within the computer readable storage device, and a Universal Resource Locator (URL) link to download a copy of the one or more firmware components from the remotely located system.

In some embodiments, the first set of program instructions may be executed to check the path stored within the recovery table to determine if the one or more firmware components are stored within the computer readable storage device or missing from the computer readable storage device. If the first set of program instructions determines that the at least one firmware component is missing from the computer readable storage device, the second set of program instructions may use the URL link stored within the recovery table to download a copy of the at least one firmware component from the remotely located system.

BRIEF DESCRIPTION OF THE DRAWINGS

Other advantages of the present disclosure will become apparent upon reading the following detailed description and upon reference to the accompanying drawings in which.

Figure 1:
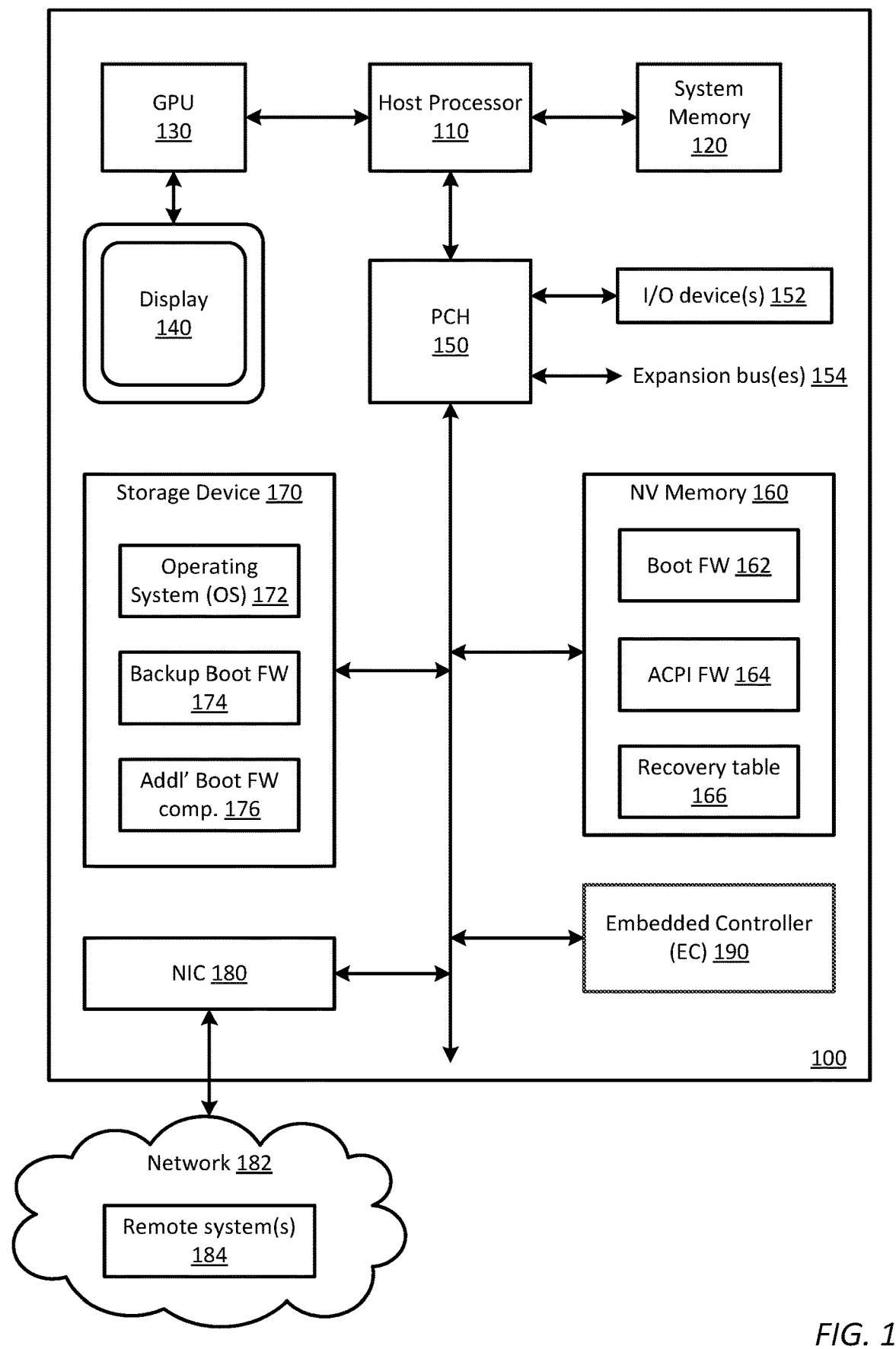
FIG. 1 is a block diagram illustrating one embodiment of an information handling system (IHS) according to one embodiment of the present disclosure.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

FIG. 1 is a block diagram of an information handling system 100 (e.g., a desktop computer, laptop computer, tablet computer, server, Internet of Things (IoT) device, etc.) as it may be configured according to one embodiment of the present disclosure. As shown in FIG. 1, IHS 100 may generally include at least one processing device (e.g., host processor) 110, system memory 120, graphics processor unit (GPU) 130, display device 140, platform controller hub (PCH) 150, input/output (I/O) devices 152, expansion bus(es) 154, computer readable non-volatile (NV) memory 160, computer readable storage device 170, network interface card (NIC) 180, and embedded controller (EC) 190.

It is expressly noted that the IHS configuration shown in FIG. 1 is exemplary only, and that the methods disclosed herein may be implemented on any type and/or configuration of information handling system having one or more processing devices, a computer readable non-volatile memory, a computer readable storage device and a network interface card. It will be further understood that while certain components of the information handling system are shown in FIG. 1 for illustrating embodiments of the present disclosure, the information handling system disclosed herein is not restricted to including only those components shown in FIG. 1 and described below.

Host processor 110 may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, host processor 110 may include at least one central processing unit (CPU) having one or more processing cores. The CPU may include any type of processing device, such as an Intel Pentium series processor, an Advanced Micro Devices (AMD) processor or another processing device.

System memory 120 is coupled to host processor 110 and generally configured to store program instructions (or computer program code), which are executable by host processor 110. System memory 120 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

Graphics processor unit (GPU) 130 is coupled to host processor 110 and configured to coordinate communication between the host processor and one or more display components of the IHS. In the embodiment shown in FIG. 1, GPU 130 is coupled to display device 140 and configured to provide visual images (e.g., a graphical user interface, warning messages and/or user prompts) to the user. In some embodiments, GPU 130 may be coupled to one or more display ports to support additional display functions. Although GPU 130 is shown as a separate processing device in the embodiment of FIG. 1, GPU 130 may be omitted in other embodiments, when the functionality provided thereby is integrated within host processor 110 in a system-on-chip (SoC) design. In some embodiments, IHS 100 may include other types of processing devices including, but not limited to, a graphics-derivative processor (such as a physics/gaming processor), a digital signal processor (DSP), etc.

Platform controller hub (PCH) 150 (otherwise referred to as a southbridge controller or chipset) is coupled to host processor 110 and configured to handle I/O operations for the IHS. As such, PCH 150 may include a variety of communication interfaces and ports for communicating with various system components, such as input/output (I/O) devices 152, expansion bus(es) 154, computer readable NV memory 160, computer readable storage device 170, NIC 180, and EC 190.

Examples of communication interfaces and ports that may be included within PCH 150 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface. Examples of expansion bus(es) 154 that may be coupled to PCH 150 include, but are not limited to, a PCI bus, a PCIe bus, a SATA bus, a USB bus, etc.

I/O devices 152 enable the user to interact with IHS 100, and to interact with software/firmware executing thereon. In some embodiments, one or more I/O devices 152 may be present within, or coupled to, IHS 100. In some embodiments, I/O device(s) 152 may be separate from the IHS and may interact with the IHS through a wired or wireless connection. Examples of I/O devices 152 include, but are not limited to, keyboards, keypads, touch screens, mice, scanning devices, voice or optical recognition devices, and any other devices suitable for entering or retrieving data.

Computer readable memory 160 may include any type of non-volatile (NV) memory including, but not limited to, read-only memory (ROM), Flash memory (e.g., SPI Flash memory), and non-volatile random-access memory (NVRAM), and may be generally configured to store software and/or firmware modules. The software and/or firmware modules stored within computer readable NV memory 160 may generally contain program instructions (or computer program code), which may be executed by host processor 110 to instruct components of IHS 100 to perform various tasks and functions for the information handling system.

As shown in FIG. 1, for example, computer readable NV memory 160 may be configured to store boot firmware (FW) 162 and Advanced Configuration and Power Interface (ACPI) firmware 164, in addition to other software and/or firmware modules. In some embodiments, a recovery table 166 may also be stored within NV memory 160. As described in more detail below, recovery table 166 may store a path to a local file stored on computer readable storage device 170, and a link to download a copy of the local file from a remote system 184 if the local file is determined to be missing.

Computer readable storage device 170 may be any type of persistent, non-transitory computer readable storage device, such as one or more hard disk drives (HDDs) or solid-state drives (SSDs), and may be generally configured to store software and/or data. For example, computer readable storage device 170 may be generally configured to store an operating system (OS) 172 for the IHS, in addition to other software modules and user data. As known in the art, OS 172 may contain program instructions (or computer program code), which may be executed by host processor 110 to perform various tasks and functions for the information handling system and/or for the user.

The boot firmware 162 stored within NV memory 160 may include system BIOS firmware and/or UEFI firmware. In some embodiments, boot firmware 162 may include the entire contents of the system BIOS firmware (e.g., a "main BIOS image"). Due to size constraints (e.g., 32 MB) of NV memory 160, a backup copy of the boot firmware 174 (e.g., a "BIOS recovery image") may be stored within computer readable storage device 170. In some embodiments, additional boot firmware components 176 that provide extended or optional boot features may also be stored within computer readable storage device 170, due to the size constraints of NV memory 160. Although not strictly limited to such, the backup boot firmware and/or additional boot firmware components may be stored within an EFI system partition (ESP) of the computer readable storage device 170, in one embodiment.

In some embodiments, the backup boot firmware 174 (e.g., a "BIOS recovery image") stored within computer readable storage device 170 may be substantially identical to the boot firmware 162 (e.g., the "main BIOS image") stored within NV memory 160. By storing the BIOS recovery image within computer readable storage device 170, the BIOS recovery image may be used to replace or recover the main BIOS image stored in NV memory 160, if the main BIOS image is found to be missing, misconfigured or corrupt.

The additional boot firmware components 176 stored within computer readable storage device 170 may generally include custom boot features, optional boot features, or extended boot features that simply don't fit within the size constraints imposed upon NV memory 160. In one example, the additional boot firmware components 176 stored within computer readable storage device 170 may include boot services (e.g., various wireless UEFI drivers) that enable the IHS to connect to a remotely located system in the pre-boot environment. In another example, the additional boot firmware components 176 may include ESP partition configuration files, OS (or OEM specific) bootloader files, etc.

As known in the art, the boot firmware 162 stored within NV memory 160 includes boot services and runtime services. Boot services are available for execution when the boot firmware owns the system platform during a pre-boot phase before the operating system (OS) is loaded and running. Runtime services, on the other hand, are available for execution while the OS is running (i.e., during OS runtime).

As described in more detail below, boot firmware 162 may include one or more boot services that may be executed by host processor 110 to perform various steps of the methods shown in FIGS. 3 and 4 and disclosed herein. For example, boot firmware 162 may include a pre-boot monitoring agent (i.e., a boot service of boot firmware 162), which may be executed by the host processor to determine if the backup boot firmware 174 and/or the additional boot firmware components 176 are stored within the computer readable storage device 170. In one embodiment, the pre-boot monitoring agent may scan an ESP partition of the computer readable storage device 170 to locate the backup boot firmware 174 and/or the additional boot firmware components 176 previously stored therein.

Figure 2:
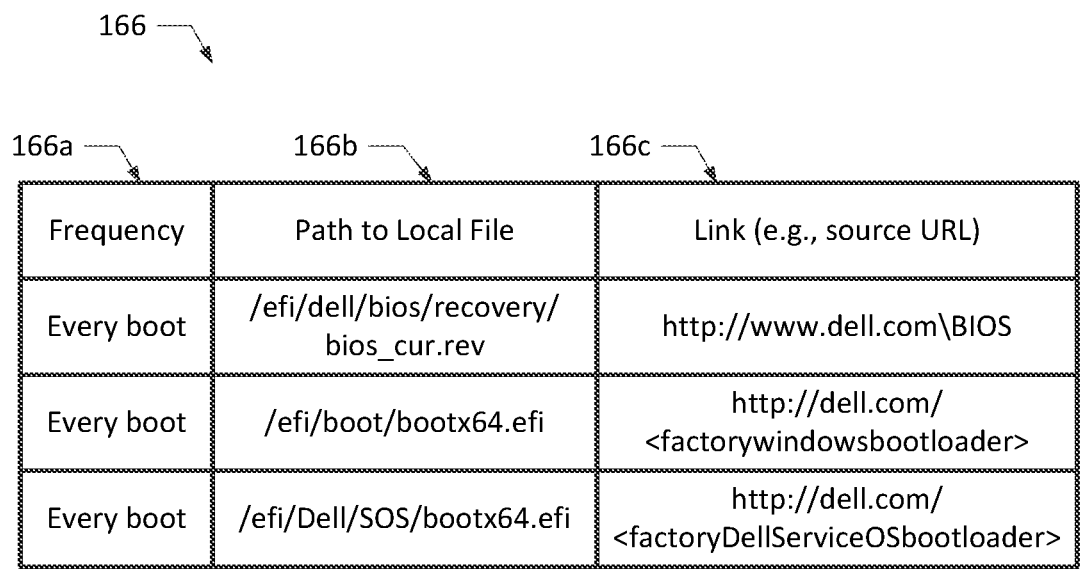
FIG. 2 is a block diagram illustrating one embodiment of a table that may be used to locate boot firmware component(s) on a computer readable storage device of an IHS, and proactively restore any boot firmware component(s) determined to be missing.

In another embodiment, the pre-boot monitoring agent may access the recovery table 166 stored, for example, within NV memory 160 to locate the backup boot firmware 174 and/or the additional boot firmware components 176 previously stored within the computer readable storage device 170. As shown in FIG. 2, recovery table 166 may include a path 166*b* to a local file stored on computer readable storage device 170, and a link 166*c* to download a copy of the local file from a remotely located system if the local file is determined to be missing. In one embodiment, path 166*b* may specify a file location of backup boot firmware 174 (e.g., /efi/dell/bios/recovery/bios cur.rev) and/or additional boot firmware components 176 stored within computer readable storage device 170, and link 166*c* may be a Universal Resource Locator (URL) link to a copy of the backup boot firmware 174 (e.g., http://www.dell.com\BIOS) and/or the additional boot firmware components 176 stored within a remotely located system 184. The URL links 166*c* may either be hardcoded into firmware, or may be signed and stored within non-volatile memory. In some embodiments, recovery table 166 may also specify the frequency 166*a* with which the path(s) 166*b* are checked (e.g., at every boot, on a schedule or a specific condition) by the pre-boot monitoring agent.

If the pre-boot monitoring agent cannot locate the backup boot firmware 174 and/or additional boot firmware components 176 within the computer readable storage device 170, a copy of the missing component(s) is retrieved from a remotely located system 184 and stored within the computer readable storage device. In some embodiments, an additional boot service of boot firmware 162 (e.g., a BIOS Connect service provided by Dell Inc.) may be executed by host processor 110 to download the copy of the missing component(s) from the remotely located system 184 in the pre-boot environment. In other embodiments, an ACPI runtime service (e.g., a WPBT ACPI agent) may be executed by host processor 110 to download the copy of the missing component(s) from the remotely located system 184 in the OS environment.

The ACPI firmware 164 stored within NV memory 160 serves as an interface layer between boot firmware 162 and OS 172, and provides OS-independent interfaces between the platform hardware and OS-specific technologies, interfaces and code. ACPI firmware 164 includes ACPI tables, ACPI BIOS and ACPI registers. During the pre-boot phase of boot firmware 162, ACPI firmware 164 communicates available hardware components and their functions to OS 172 using methods provided by boot firmware 162, and constructs all ACPI tables and populates the interfaces and handlers to be used during OS runtime. The ACPI tables are used during OS runtime to provide ACPI runtime services to OS 172, and include hooks to all handlers where the runtime services are called.

As described in more detail below, ACPI firmware 164 may include one or more ACPI runtime services, which may be executed by host processor 110 to perform various steps of the method shown in FIG. 4 and disclosed herein. In some embodiments, for example, ACPI firmware 164 may include an ACPI runtime service (e.g., an OS-based agent), which may be called during OS runtime to access a remotely located system 184 and download a copy of any firmware components that the pre-boot monitoring agent determined to be missing from the computer readable storage device 170. Although not limited to such, the ACPI runtime service may be a Windows Platform Binary Table (WPBT) ACPI agent, in one embodiment.

NIC 180 enables IHS 100 to communicate with one or more remotely located systems and/or services 184 via an external network 182 using one or more communication protocols. Network 182 may be a local area network (LAN), wide area network (WAN), personal area network (PAN), or the like, and the connection to and/or between IHS 100 and network 182 may be wired, wireless or a combination thereof. For purposes of this discussion, network 182 is indicated as a single collective component for simplicity. However, it is appreciated that network 182 may comprise one or more direct connections to other remote systems and/or services, as well as a more complex set of interconnections as can exist within a wide area network, such as the Internet. NIC 180 may communicate data and signals to/from IHS 100 using any known communication protocol.

According to one embodiment of the present disclosure, IHS 100 may utilize NIC 180 to access and retrieve software/firmware from a remotely located system 184 (e.g., a network connected server, or server cloud). As noted above, the remotely located system 184 may store copies of the backup boot firmware 174 and/or the additional boot firmware components 176 stored within computer readable storage device 170. Access to the remotely located system 184 may be provided by a boot service (e.g., Dell BIOS Connect) executed in the pre-boot environment, or by ACPI runtime service (e.g., a WPBT ACPI agent) executed in the OS environment.

Embedded controller (EC) 190 is generally configured to boot the information handling system and perform other functions for the information handling system. EC 190 may generally include read only memory (ROM), random access memory (RAM) and a processing device (e.g., a controller, microcontroller, microprocessor, ASIC, etc.) for executing program instructions stored within its internal ROM and RAM. For example, EC 190 may be configured to execute program instructions (e.g., a boot block) stored in ROM to initiate a boot process for the information handling system.

Upon system start-up or reboot, the processing device of EC 190 may initiate a boot process for the information handling system by executing the boot block stored within the EC ROM while PCH 150 and host processor 110 are in reset. As used herein, an IHS "boot process" is a process or set of operations performed by an information handling system component (e.g., EC 190 and/or host processor 110) to load and execute a boot system (e.g., BIOS and/or UEFI) and prepare the system for OS booting. When host processor 110 comes out of reset, the host processor retrieves the boot firmware 162 from NV memory 160, stores a local copy of the boot firmware within system memory 120, and executes the boot firmware to configure hardware components of the IHS, perform a Power-On Self-Test (POST) to ensure the hardware configuration is valid and working properly, discover and initialize devices, and launch a bootloader to load OS 172. Once launched, the bootloader within boot firmware 162 retrieves OS 172 from computer readable storage device 170 and loads it into system memory 120.

In some cases, errors in the IHS boot process (or in a previous boot process) may cause the boot system to fail. As noted above, a boot failure may occur when the boot firmware 162 (e.g., the "main BIOS image") stored in NV memory 160 is missing, misconfigured or corrupt. If the boot firmware 162 is damaged or corrupt, EC 190 and host processor 110 may fail to boot the information handling system and the system may be left in a hung state. To avoid such a problem, a boot recovery system is generally needed to recover the boot system by replacing the damaged boot firmware with an undamaged copy.

As noted above, the backup boot firmware 174 (e.g., a "BIOS recovery image") stored within computer readable storage device 170 may be used to replace or recover the boot firmware 162 (e.g., the "main BIOS image") stored within NV memory 160 when the boot firmware is missing, misconfigured or corrupt. In some cases, however, the backup boot firmware 174 may be missing from computer readable storage device 170 if the user replaces or reformats the computer readable storage device. In some cases, the additional boot firmware components 176 (e.g., custom boot features, optional boot features, or extended boot features) previously stored within computer readable storage device 170 may also be missing if the user replaces or reformats the computer readable storage device.

Generally speaking, the present disclosure provides embodiments of improved information handling systems and methods for proactively restoring missing boot firmware component(s) (e.g., backup boot firmware 174 and/or additional boot firmware components 176 that provide extended or optional boot features) to a computer readable storage device 170 of an information handling system (IHS). One embodiment of such an information handling system 100 is shown in FIG. 1. Each time IHS 100 is booted, host processor 110 may execute a boot service of boot firmware 162 to locate the backup boot firmware 174 and/or the additional boot firmware components 176 on the computer readable storage device 170. If the boot firmware component(s) are determined to be missing, host processor 110 may execute another boot service of boot firmware 162, or a runtime service of ACPI firmware 164, to proactively restore the missing boot firmware component(s). As noted above, the missing boot firmware component(s) may be restored by retrieving a copy of the missing boot firmware component(s) from a remotely located system 184, and storing the retrieved copy within the computer readable storage device 170 of the IHS.

Figure 3:
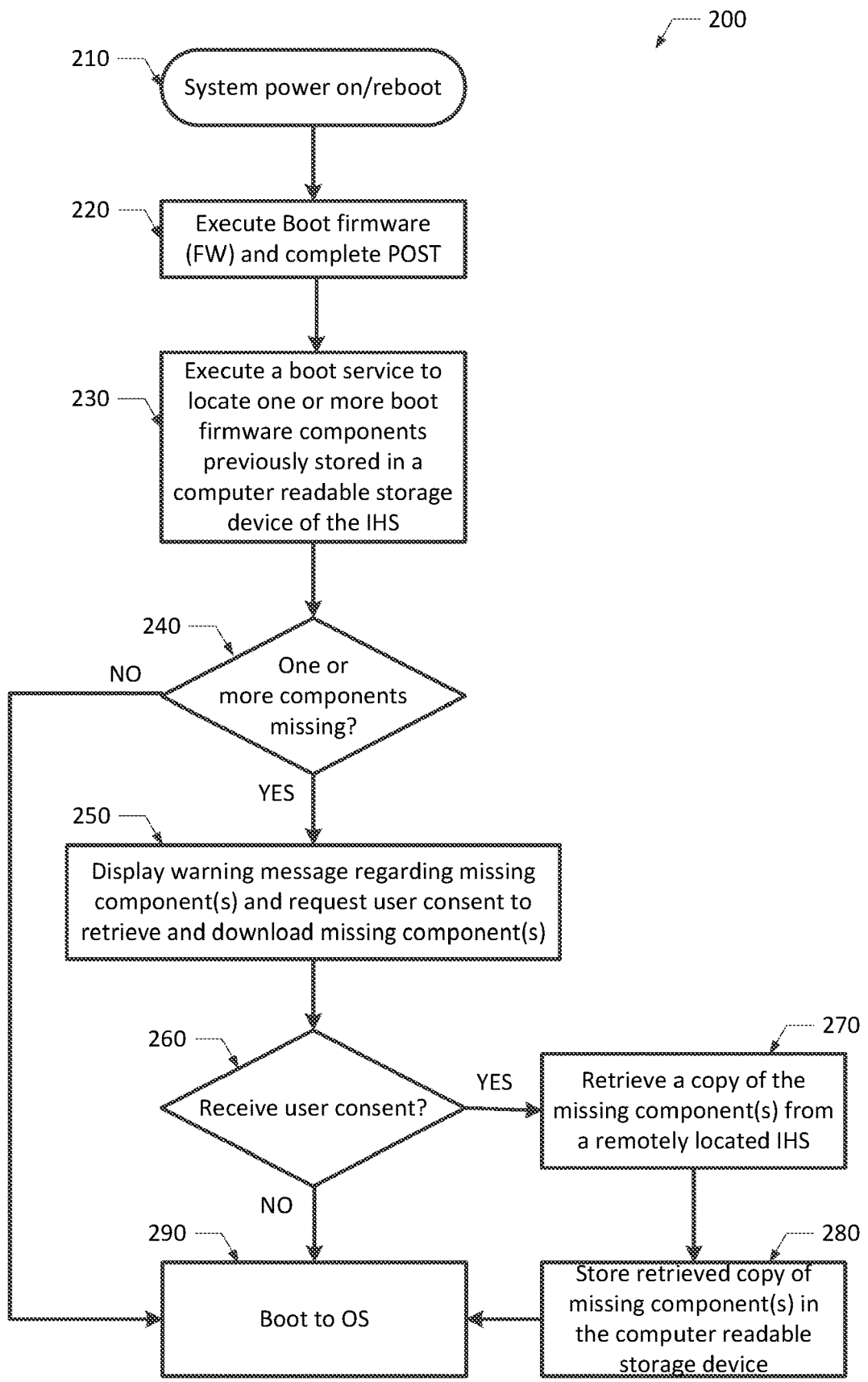
FIG. 3 is a flowchart diagram illustrating one embodiment of a method that may be performed during an IHS boot process to locate boot firmware component(s) on a computer readable storage device of an IHS, and proactively restore any boot firmware component(s) determined to be missing.

FIG. 3 illustrates one embodiment of a method 200, which may be performed during an information handling system (IHS) boot process to proactively restore one or more boot firmware component(s) to a computer readable storage device of an IHS. FIG. 4 illustrates one embodiment of a method 300, which may be performed during an IHS boot process and during OS runtime to proactively restore one or more boot firmware component(s) to a computer readable storage device of an IHS.

Figure 4:
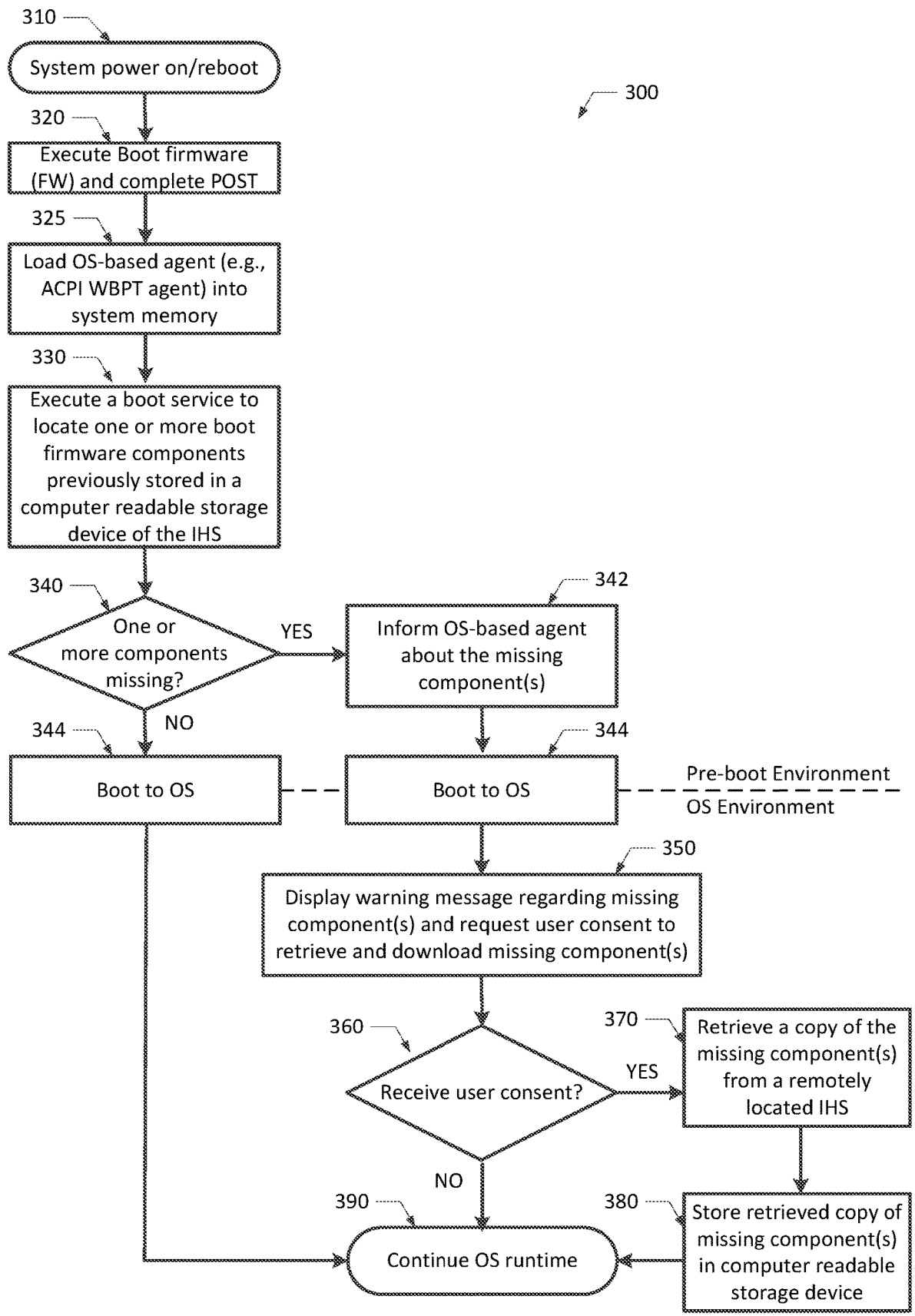
FIG. 4 is a flowchart diagram illustrating one embodiment of a method that may be performed during an IHS boot process to locate boot firmware component(s) on a computer readable storage device of an IHS, and during operating system (OS) runtime to proactively restore boot firmware component(s) determined to be missing.

The methods shown in FIGS. 3 and 4 are computer implemented methods performed, at least in part, by a processing device (e.g., host processor 110) of an information handling system (e.g., IHS 100). According to one example implementation, host processor 110 may perform the method steps shown in FIGS. 3 and 4 by executing program instructions (e.g., boot service(s) of boot firmware 162 and/or runtime service(s) of ACPI firmware 164) stored within NV memory 160. Unlike conventional information handling systems, the computer implemented methods shown in FIGS. 3 and 4 may be used to improve the way in which an information handling system functions, in one respect, by determining if boot firmware component(s) are stored within a computer readable storage device (e.g., computer readable storage device 170) at every system boot, and proactively restoring any boot firmware component(s) determined to be missing to the computer readable storage device before such component(s) are actually needed.

The method 200 shown in FIG. 3 is performed entirely in the pre-boot environment (i.e., during the pre-boot phase when the boot firmware 162 controls the platform before the OS 172 is loaded and running). In the pre-boot environment, boot services of boot firmware 162 may be provided access to the ESP partition of computer readable storage device 170 with read/write permissions (if the storage device is not encrypted or password protected). If access is provided, the boot services can store copies of missing boot firmware component(s) within the ESP partition without requiring a user to go through the typical BIOS update process. In the embodiment shown in FIG. 4, some steps of method 300 are performed in the pre-boot environment, while others are performed in the OS environment (i.e., when the OS has control of the platform). The method steps performed in the OS environment enable copies of missing boot firmware component(s) within the ESP partition of computer readable storage device 170 when the storage device is encrypted or password protected.

As shown in FIG. 3, method 200 may begin upon system start-up or reboot (in step 210) when boot firmware is executed to perform a boot process for an information handling system (in step 220). As noted above, boot firmware may be executed to configure hardware components of the IHS, perform a Power-On Self-Test (POST) to ensure the hardware configuration is valid and working properly, discover and initialize devices and launch a bootloader to load an operating system for the IHS.

After completing POST and before booting to the OS (in step 290), a boot service (e.g., a pre-boot monitoring agent) of the boot firmware may be executed (in step 230) to locate one or more boot firmware components (e.g., backup boot firmware 174 and/or additional boot firmware components 176), which were previously stored within a computer readable storage device (e.g., computer readable storage device 170) of the IHS. As noted above, the boot firmware components may be located, for example, by scanning an ESP partition of the computer readable storage device, or by accessing a recovery table (e.g., recovery table 166) stored within a computer readable non-volatile memory (e.g., NV memory 160) of the IHS. If the boot service locates the boot firmware components within the computer readable storage device (NO branch of step 240), a bootloader may be executed to load the operating system (e.g., OS 172) into system memory (e.g., system memory 120) to boot the operating system (in step 290).

If the boot service fails to locate one or more of the boot firmware components within the computer readable storage device, and thus, determines such component(s) are missing (YES branch of step 240), the boot service displays a warning message regarding the missing component(s) and requests user consent to retrieve and download the missing component(s) from a remotely located system (in step 250). If user consent is not received (NO branch of step 260), the bootloader may be executed to load the operating system into system memory to boot the operating system (in step 290).

If user consent is received (YES branch of step 260), an additional boot service of the boot firmware is executed to retrieve a copy of the missing component(s) from a remotely located system (in step 270) and store the retrieved copy of the missing component(s) in the computer readable storage device (in step 280). In one embodiment, the BIOS Connect service provided by Dell Inc. may be executed to retrieve a copy of the missing component(s) from a remotely located system 184 over a wired or wireless network connection (in step 270). In one example implementation, the Dell BIOS Connect service may follow the Universal Resource Locator (URL) link 166*d* stored within recovery table 166 to retrieve the copy of the missing component(s) from the remotely located system 184. Since boot services executed in the pre-boot environment (such as the Dell BIOS Connect service) are provided access to the ESP partition with read/write permissions, the retrieved copy of the missing component(s) can be stored within the ESP partition of the computer readable storage device (in step 280) without requiring the user to through the typical BIOS update process.

Like the method 200 shown in FIG. 3, the method 300 shown in FIG. 4 may generally begin upon system start-up or reboot (in step 310) when the boot firmware is executed to perform a boot process for an information handling system (in step 320). After completing POST and before booting to the OS (in step 344), the method may load an OS-based agent (e.g., an ACPI runtime service, such as an ACIP WBPT agent) into system memory (in step 325), and may execute a boot service (e.g., a pre-boot monitoring agent) of the boot firmware (in step 330) to locate one or more boot firmware components, which were previously stored within a computer readable storage device (e.g., computer readable storage device 170) of the IHS. The boot firmware components (e.g., backup boot firmware 174 and/or additional boot firmware components 176) may be located within the computer readable storage device, as described above.

If the boot service locates the boot firmware components within the computer readable storage device (NO branch of step 340), a bootloader may be executed to load the operating system (e.g., OS 172) into system memory (e.g., system memory 120) to boot the operating system (in step 344). If the boot service fails to locate one or more of the boot firmware components within the computer readable storage device, and thus, determines such component(s) are missing (YES branch of step 340), the boot service informs the OS-based agent that the boot firmware components are missing (in step 342) and the bootloader is executed to boot the operating system (in step 344).

In some embodiments, the boot service may inform the OS-based agent that one or more boot firmware components are missing (in step 342) by providing an ACPI WBPT table to the OS. The ACPI WBPT table includes an application (i.e., the OS based agent), which the OS executes as part of the OS boot sequence (in step 344). When launched, the OS-based agent checks for the absence of the boot firmware components within the computer readable storage device and proceeds to step 350.

The OS-based agent operating in the OS environment displays a warning message regarding the missing component(s) and requests user consent to retrieve and download the missing component(s) from a remotely located system (in step 350). OS runtime continues (in step 390) if user consent is not received for the download (NO branch of step 360). However, if user consent is received (YES branch of step 360), the OS-based agent is executed to retrieve a copy of the missing component(s) from a remotely located system over a wired or wireless network connection (in step 370) and store the retrieved copy of the missing component(s) in the computer readable storage device (in step 380).

In one example implementation, the OS-based agent may follow the Universal Resource Locator (URL) link 166c stored within recovery table 166 to retrieve the copy of the missing component(s) from the remotely located system 184. OS runtime continues (in step 390) once the retrieved copy of the missing components are restored (in step 380).

In the embodiments disclosed above, the computer implemented methods shown in FIGS. 3 and 4 are used proactively restore missing boot firmware components (such as, e.g., backup boot firmware 174 and/or additional boot firmware components 176 that provide extended or optional boot features), which were previously stored within a computer readable storage device of an IHS. It is noted, however, that the computer implemented methods disclosed herein are not strictly limited to restoring only boot firmware components. In other embodiments, the disclosed computer implemented methods may be used to restore other software/firmware modules that were previously stored within a computer readable storage device of an IHS, but no longer exist. By searching for the software/firmware modules each time the IHS is powered on or rebooted, and proactively restoring any software/firmware modules determined to be missing, the computer implemented methods disclosed herein ensure that the software/firmware modules are always available if/when needed.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system (IHS), comprising:
   a computer readable non-volatile memory configured to store boot firmware and Advanced Configuration and Power Interface (ACPI) firmware;
   a computer readable storage device configured to store one or more boot firmware components and an operating system (OS); and
   a processing device configured to execute the boot firmware when the IHS is powered on or rebooted;
   wherein before the OS is loaded into a system memory of the IHS, the processing device is configured to execute program instructions contained within a boot service of the boot firmware to locate the one or more boot firmware components stored within the computer readable storage device; and
   wherein if the boot service determines at least one of the boot firmware components is missing from the computer readable storage device, the processing device is configured to execute additional program instructions to:
   retrieve a copy of the at least one boot firmware component from a remotely located system; and
   store the retrieved copy of the at least one boot firmware component within the computer readable storage device.

2. The information handling system as recited in claim 1, wherein the additional program instructions are contained within an additional boot service of the boot firmware and executed by the processing device before the OS is loaded into the system memory.

3. The information handling system as recited in claim 1, wherein the additional program instructions are contained within a runtime service of the ACPI firmware and executed by the processing device after the OS is loaded into the system memory and executed by the processing device.

4. The information handling system as recited in claim 1, wherein prior to said retrieving a copy of the at least one boot firmware component, the processing device is configured to execute further program instructions to display a warning message informing a user of the IHS that the at least one boot firmware component is missing and requesting user consent to retrieve the copy of the at least one boot firmware component from the remotely located system.

5. The information handling system as recited in claim 4, wherein the copy of the at least one boot firmware component is retrieved from the remotely located system only if user consent is received.

6. The information handling system as recited in claim 1, wherein the computer readable non-volatile memory is further configured to store a recovery table comprising:
   a path specifying a file location of each boot firmware component stored within the computer readable storage device; and
   a Universal Resource Locator (URL) link to download a copy of the one or more boot firmware components from the remotely located system.

7. The information handling system as recited in claim 6, wherein the boot service is configured to check the path stored within the recovery table to locate the one or more boot firmware components stored within the computer readable storage device.

8. The information handling system as recited in claim 7, wherein if the boot service determines at least one boot firmware component is missing from the computer readable storage device, the URL link stored within the recovery table is used to download a copy of the at least one boot firmware component from the remotely located system.

9. The information handling system as recited in claim 8, wherein the URL link stored within the recovery table is used by an additional boot service of the boot firmware to retrieve a copy of the at least one boot firmware component from the remotely located system and store the received copy of the at least one boot firmware component within the computer readable storage device before the OS is loaded into the system memory.

10. The information handling system as recited in claim 8, wherein the URL link stored within the recovery table is used by a runtime service of the ACPI firmware to retrieve a copy of the at least one boot firmware component from the remotely located system and store the received copy of the at least one boot firmware component within the computer readable storage device after the OS is loaded into the system memory.

11. A computer-implemented method performed by a processing device of an information handling system (IHS)

to proactively restore missing firmware components to a computer readable storage device of the IHS, the method comprising:

executing a first set of program instructions, before an operating system (OS) is loaded into a system memory of the IHS, to locate one or more firmware components previously stored within the computer readable storage device, wherein if the first set of program instructions determines that at least one of the one or more firmware components is missing from the computer readable storage device, the method further comprises:

executing a second set of program instructions to retrieve a copy of the at least one firmware component from a remotely located system; and executing a third set of program instructions to store the retrieved copy of the at least one firmware component within the computer readable storage device.

12. The method as recited in claim 11, wherein if the one or more firmware components are located within the computer readable storage device, the method further comprises loading the OS into the system memory to boot the OS.

13. The method as recited in claim 11, wherein the second set of program instructions and the third set of program instructions are executed by the processing device before the OS is loaded into the system memory, if the first set of program instructions determines that at least one firmware component is missing from the computer readable storage device.

14. The method as recited in claim 11, wherein the second set of program instructions and the third set of program instructions are executed by the processing device after the OS is loaded into the system memory, if the first set of program instructions determines that at least one firmware component is missing from the computer readable storage device.

15. The method as recited in claim 11, wherein if the first set of program instructions determines that the at least one firmware component is missing from the computer readable storage device, the method further comprises:

executing a fourth set of program instructions to display a warning message informing a user of the IHS that the at least one firmware component is missing and requesting user consent to retrieve the copy of the at least one firmware component from the remotely located system.

16. The method as recited in claim 15, wherein the second set of program instructions are executed to retrieve the copy of the at least one firmware component from the remotely located system only if user consent is received.

17. The method as recited in claim 11, wherein a computer readable non-volatile memory of the IHS is configured to store a recovery table comprising:

a path specifying a file location of each firmware component stored within the computer readable storage device; and a Universal Resource Locator (URL) link to download a copy of the one or more firmware components from the remotely located system.

18. The method as recited in claim 17, wherein the first set of program instructions are executed by the processing device to check the path stored within the recovery table to determine if the one or more firmware components are stored within the computer readable storage device or missing from the computer readable storage device.

19. The method as recited in claim 18, wherein if the first set of program instructions determines that the at least one firmware component is missing from the computer readable storage device, the second set of program instructions use the URL link stored within the recovery table to download a copy of the at least one firmware component from the remotely located system.

* * * * *